UNITED STATES PATENT OFFICE.

JAMES R. WHITING, OF NEW YORK, N. Y.

IMPROVEMENT IN COMPOSITION HOP-EXTRACT.

Specification forming part of Letters Patent No. 190,801, dated May 15, 1877; application filed May 3, 1877.

*To all whom it may concern:*

Be it known that I, JAMES R. WHITING, of the city of New York, in the county of New York and State of New York, have invented a certain new and useful composition, being an Improved Hop-Flavoring or Bakers' Yeast-Hops, to be used in hopping down beer, and in hopping yeast, and for all other purposes for which hops and sugar can be used, which compound is fully described in the following specification.

This invention consists in a composition formed by uniting hop-extract with sugar or any pure saccharine matter, and in melting and uniting the component parts in such a manner that the composition, when introduced into the beer, will freely dissolve, leaving the aroma and flavor of the hops in the beer; and, also, when used for hopping yeast, it will dissolve quickly in hot or boiling water.

To prepare this composition, take one pound of hop-extract and twenty pounds of sugar, or the equivalent thereof of any pure saccharine matter, and subject these materials to such an amount of heat that they will readily mix by stirring and thoroughly unite.

The above proportions of the materials are not arbitrary, but the composition so made works well for the purposes for which the same is used. The best white sugar is preferable; but other kinds may be used.

The composition is most convenient for use when granulated.

The value and usefulness of my invention consists in rendering the extract of hops practically and easily soluble in fermented beer, by which it is rendered useful in flavoring the beer; and, also, by rendering the extract of hops easily soluble in hot water, it is made practically and valuably useful in hopping yeast, and for all other purposes for which hops and sugar united can be used.

Having described my invention, what I claim, and desire to secure by Letters Patent, is—

The composition hop-extract, consisting of extract of hops and pure sugar, substantially in the proportions specified, forming a solid substance, substantially as described.

J. R. WHITING.

Witnesses:
W. S. TERHUNE,
AUG. H. ALLEN.